US006595847B1

United States Patent
Freese et al.

(10) Patent No.: US 6,595,847 B1
(45) Date of Patent: Jul. 22, 2003

(54) AUTOMATIC AMBIENT AIR CONTROL SYSTEM AND METHOD FOR REFRIGERATED CONTAINER

(75) Inventors: Mark Freese, Eagan, MN (US); Neil D. Tamppari, Minneapolis, MN (US); Randy S. Burnham, Brooklyn Park, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 09/979,796

(22) PCT Filed: Nov. 23, 1999

(86) PCT No.: PCT/US99/27846
§ 371 (c)(1),
(2), (4) Date: Nov. 6, 2001

(87) PCT Pub. No.: WO00/31478
PCT Pub. Date: Jun. 2, 2000

Related U.S. Application Data
(60) Provisional application No. 60/109,985, filed on Nov. 25, 1998.

(51) Int. Cl.[7] .............................................. B60H 1/00
(52) U.S. Cl. .......................................... 454/118; 62/78
(58) Field of Search ........................ 454/88, 118; 62/78; 165/248

(56) References Cited

U.S. PATENT DOCUMENTS

| | | | |
|---|---|---|---|
| 3,315,730 A | 4/1967 | Weaver et al. | |
| 3,563,757 A | * 2/1971 | Dixon | .......................... 99/472 |
| 3,699,870 A | * 10/1972 | Cantagallo et al. | ......... 454/118 |
| 4,023,947 A | 5/1977 | Ferry | |
| 4,175,401 A | 11/1979 | McManus | |
| 4,178,770 A | 12/1979 | Fox | |
| 4,257,240 A | 3/1981 | Christiansen et al. | |
| 4,293,027 A | 10/1981 | Tepe et al. | |
| 4,320,628 A | 3/1982 | Okajima | |
| 4,347,712 A | 9/1982 | Benton et al. | |
| 4,391,320 A | 7/1983 | Inoue et al. | |
| 4,463,801 A | 8/1984 | Yoshimi et al. | |
| 4,640,183 A | 2/1987 | Doi | |
| 4,642,996 A | 2/1987 | Harris et al. | |
| 4,671,073 A | 6/1987 | Ohi | |
| 4,716,739 A | 1/1988 | Harris et al. | |
| 4,987,745 A | 1/1991 | Harris | |
| 5,063,753 A | * 11/1991 | Woodruff | ..................... 62/239 |
| 5,355,781 A | 10/1994 | Liston et al. | |
| 5,457,963 A | 10/1995 | Cahill-O'Brien et al. | |
| 5,515,693 A | 5/1996 | Cahill-O'Brien et al. | |
| 5,590,540 A | 1/1997 | Ikeda et al. | |
| 5,720,181 A | 2/1998 | Karl et al. | |
| 5,749,236 A | 5/1998 | Tavian et al. | |
| 5,799,495 A | 9/1998 | Gast, Jr. et al. | |
| 5,801,317 A | 9/1998 | Liston et al. | |
| 5,872,721 A | 2/1999 | Huston et al. | |
| 6,471,136 B1 | * 10/2002 | Chatterjee et al. | .......... 237/2 B |

FOREIGN PATENT DOCUMENTS

| | | |
|---|---|---|
| GB | 1132151 | 10/1968 |
| GB | 1132152 | 10/1968 |

* cited by examiner

Primary Examiner—Harold Joyce
(74) Attorney, Agent, or Firm—Michael Best & Friedrich LLP

(57) ABSTRACT

A container for transporting a load in conditioned space air, where the container includes a number of walls defining a closed conditioned space with an ambient air intake opening and a conditioned space air exhaust opening provided on one of the container walls; a temperature control system for controlling the temperature of the conditioned space air; an ambient air exchange so system having a door movable relative to the exhaust and intake openings to thereby change the rate that conditioned space air is exchanged with ambient air, and a motor for repositioning the ambient air exchange door. The container also including a container controller in signal transmitting relation with the air exchange door repositioning motor. The controller sends signals to the repositioning motor to move the ambient air exchange door to a position which produces the required ambient air exchange rate to preserve the load.

22 Claims, 12 Drawing Sheets

AUTOMATIC AMBIENT AIR CONTROL SYSTEM AND METHOD FOR REFRIGERATED CONTAINER

This application claims the benefit of U.S. Provisional Application No. 60/109,985, filed Nov. 25, 1998.

BACKGROUND OF THE INVENTION

The invention relates to a system for controlling the ambient air exchange rate of a refrigerated container to control the composition of the conditioned space air, and more particularly the invention relates to a system and method for controlling the composition of the conditioned space air by automatically and precisely setting and controlling the ambient air exchange rate of refrigerated container by comparing a predetermined set point value for a container operating parameter with a sensed value for the operating parameter, and if the sensed value is outside the set point value, automatically adjusting the air exchange rate to obtain the conditioned space air concentration required to preserve the container cargo.

Containers are loaded with perishable cargo such as fruits, vegetables, and flowers for example, and the loaded containers are then placed on ships which bring the perishable cargo to its destination a number of days after the cargo has been loaded in the container. When transporting a temperature controlled load of perishable cargo, the cargo is subject to degradation due to varying concentration levels of common gasses in the conditioned space defined by the transport container. Fresh air exchange with the conditioned space air is used to help prolong the life of the cargo transported in the conditioned space. The commonly present conditioned space gasses include nitrogen, carbon dioxide, and ethylene. Some mixtures of these gasses are beneficial and promote longevity and freshness of the cargo, while other mixtures of these gasses are harmful to the cargo and can reduce freshness and spoil the cargo.

Some of the common conditioned space gasses are actively produced by the respiration of the cargo. Upon loading, the concentration of the conditioned space gasses is acceptable. However, over time while in transit, the cargo respirates and as the gasses are emitted by the cargo, the gas concentration levels change. Depending on the nature of the composition of the conditioned space air, the change in gas concentration could reduce the freshness of the cargo and ultimately result in cargo spoilage. As a result, the concentrations of the common gases in the container conditioned space must be closely monitored and controlled during shipment to prevent the production of harmful gas concentrations.

The typical method for controlling the container concentrations of common gasses is by manually adjusting the position of a fresh air exchange door which, when opened, permits outside ambient air to enter the container and supplant the conditioned space air. After determining the fresh air exchange rate required to maintain the desired concentration of the common gasses in the container, the exchange door is manually opened as required to the door position that will produce the requisite common gas concentration levels. In such systems, the exchange door is located near the container differential air pressure caused by the fan that blows temperature conditioned air over the cargo. This differential pressure draws the ambient air into the container. This conventional method of achieving air exchange in a container conditioned space does not take into account changes to the conditioned space air during shipment. Moreover, such conventional system cannot quickly adjust door position as a result of changes in the composition of the conditioned space air and as a result of changes in the ambient air composition.

Other problems do exist with the manually adjusted fresh air exchange doors. One common problem is human error. If the door is forgotten or misadjusted by the container operator, the perishable cargo will suffer degradation. The containers are frequently placed in difficult to access locations on the ships and as a result, are inspected infrequently by a container operator. By the time the operator realizes the load is degrading due to harmful gas concentration levels, it is too late to manually reposition the door to achieve the concentration level required to save the cargo.

Another problem with conventional manually adjusted doors is illustrated when warm perishable cargo is loaded in warm ambient conditions. In this situation the combination of the cargo's warm temperature and the warm ambient air entering the container through the open door results in a very long time period for temperature to pull down in the container. The consequence of the long container pull down period is cargo degradation.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an automatic fresh air control system and method that overcomes the shortcomings of conventional manually actuated air exchange doors by the improvements generally set forth below.

An effective improvement can be made to the manual fresh air exchange door by automating the opening of the door. The movement of the door may be controlled by a motor that in turn is controlled by a microprocessor. Such a system would be customer controlled and the customer would enter an air exchange set point in cubic feet per minute, percent door open, or cubic meters per hour into the container controller. The microprocessor system then directs the door to open based on the customer input or based on the default setting if the customer forgets to enter a value. Human error is eliminated.

Further improvements are realized by noting the differential air pressure source varies based on the varying speed of the fan that blows temperature controlled air. The microprocessor system can utilize fan speed information of this variable speed fan to more accurately calculate the required door position to provide the desired fresh air exchange rate.

Further improvements are realized by noting that when warm cargo material is loaded, field heat may be more rapidly removed from the load if the fresh air exchange door remains closed during the temperature pull down to prevent introducing high ambient temperature air into the container. A closed door time limit must be implemented to prevent the door from remaining closed for too long of a period which might allow gas concentration levels to damage the load. The time limit is selectable by the customer and also has a default setting if the customer does not enter a time limit.

Further improvements are realized by incorporating a carbon dioxide sensor to monitor carbon dioxide levels within the container. The carbon dioxide levels are compared to a carbon dioxide set point to allow the microprocessor system to incrementally open or close the fresh air exchange door as needed to prevent the carbon dioxide levels from exceeding set point. This effectively limits the maximum concentration of carbon dioxide levels within the container. An oxygen sensor for monitoring oxygen levels may also be used.

Further improvements can be realized by utilizing the temperature set point of the load to automatically modify the carbon dioxide set point. The algorithm is a conversion from temperature set point to carbon dioxide set point as a percentage of gas concentration. The formula is a polynomial equation where the carbon dioxide set point equals various orders of the temperature set point with individual coefficients.

Further improvements can be realized by incorporating customer overrides for carbon dioxide set point and fresh air exchange door position. These overrides are useful when introducing a known concentration of gasses to the container, when hauling fresh fish or meats or other non-plant perishable produce, and when performing pre-trip functions to verify the health of the system that controls the temperature and atmosphere of the conditioned space.

The foregoing and other aspects will become apparent from the following detailed description of the invention when considered in conjunction with the accompanying drawing figures.

DESCRIPTION OF THE DRAWING FIGURES

DESCRIPTION OF THE PREFERRED EMBODIMENT

Figure 5:
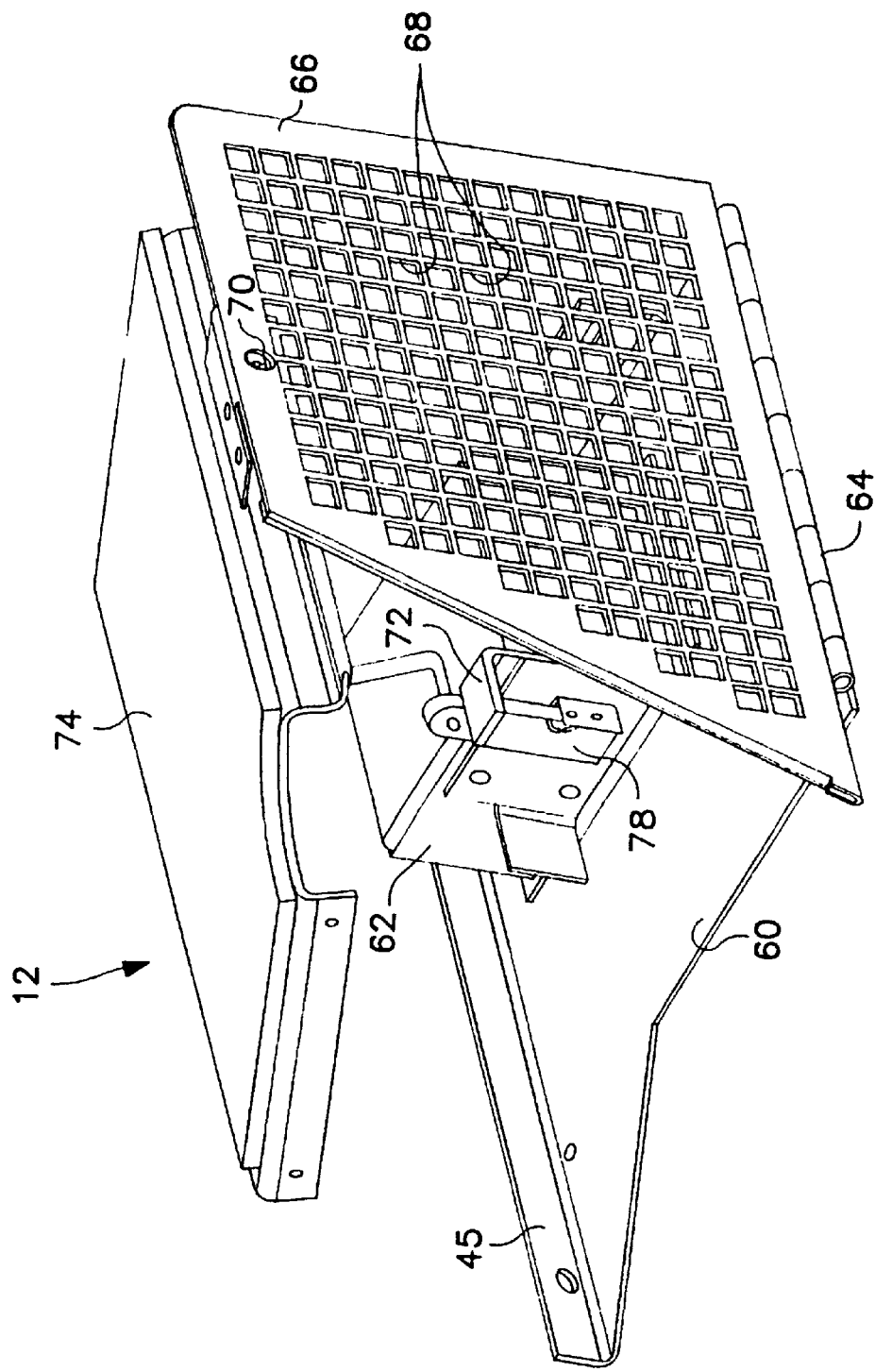
FIG. 5 is an isometric view of the fresh air exchange system of the present invention.
Figure 6:
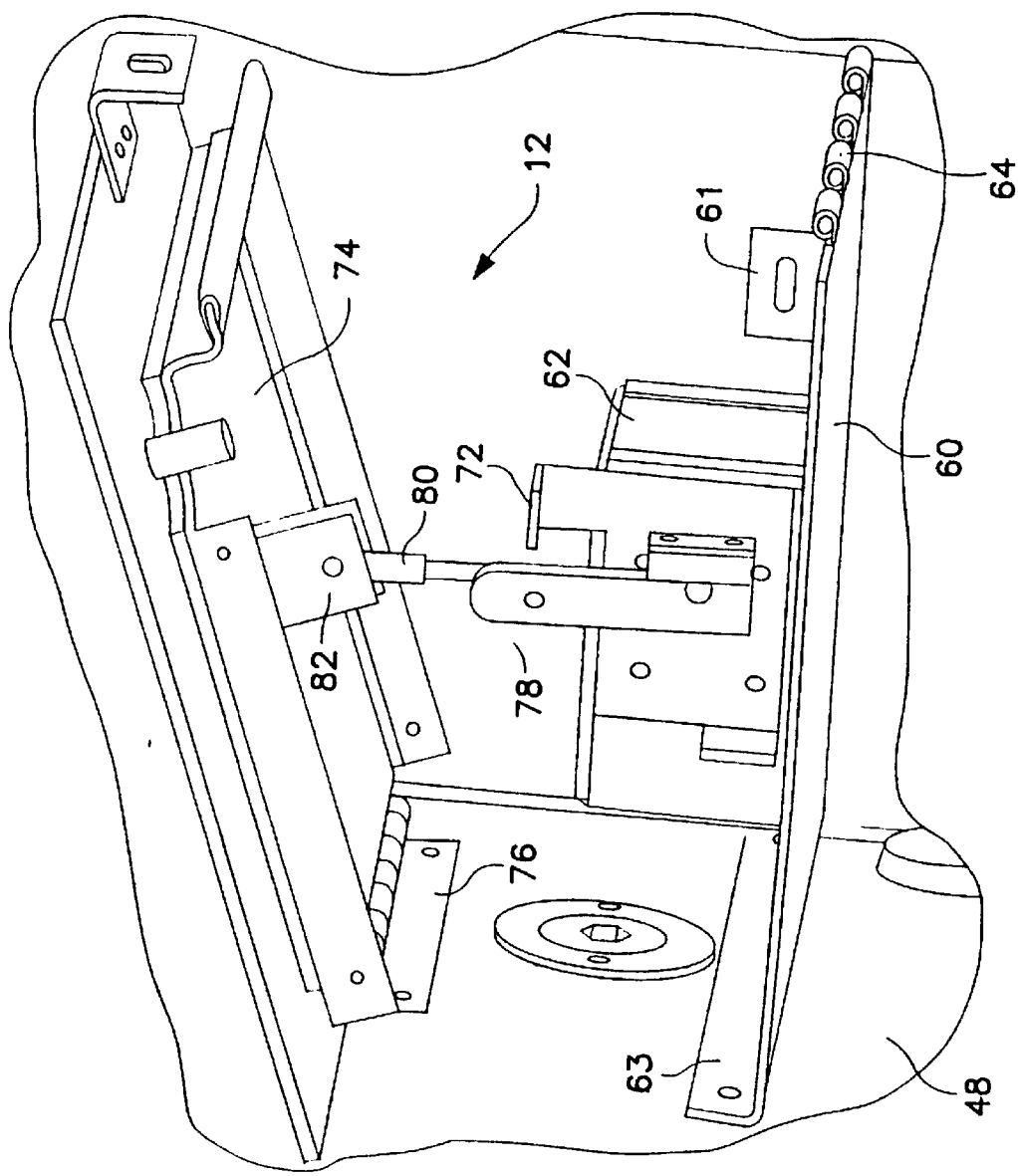
FIG. 6 is an isometric view of the fresh air exchange system of the present invention with the door in the closed position.
Figure 7:
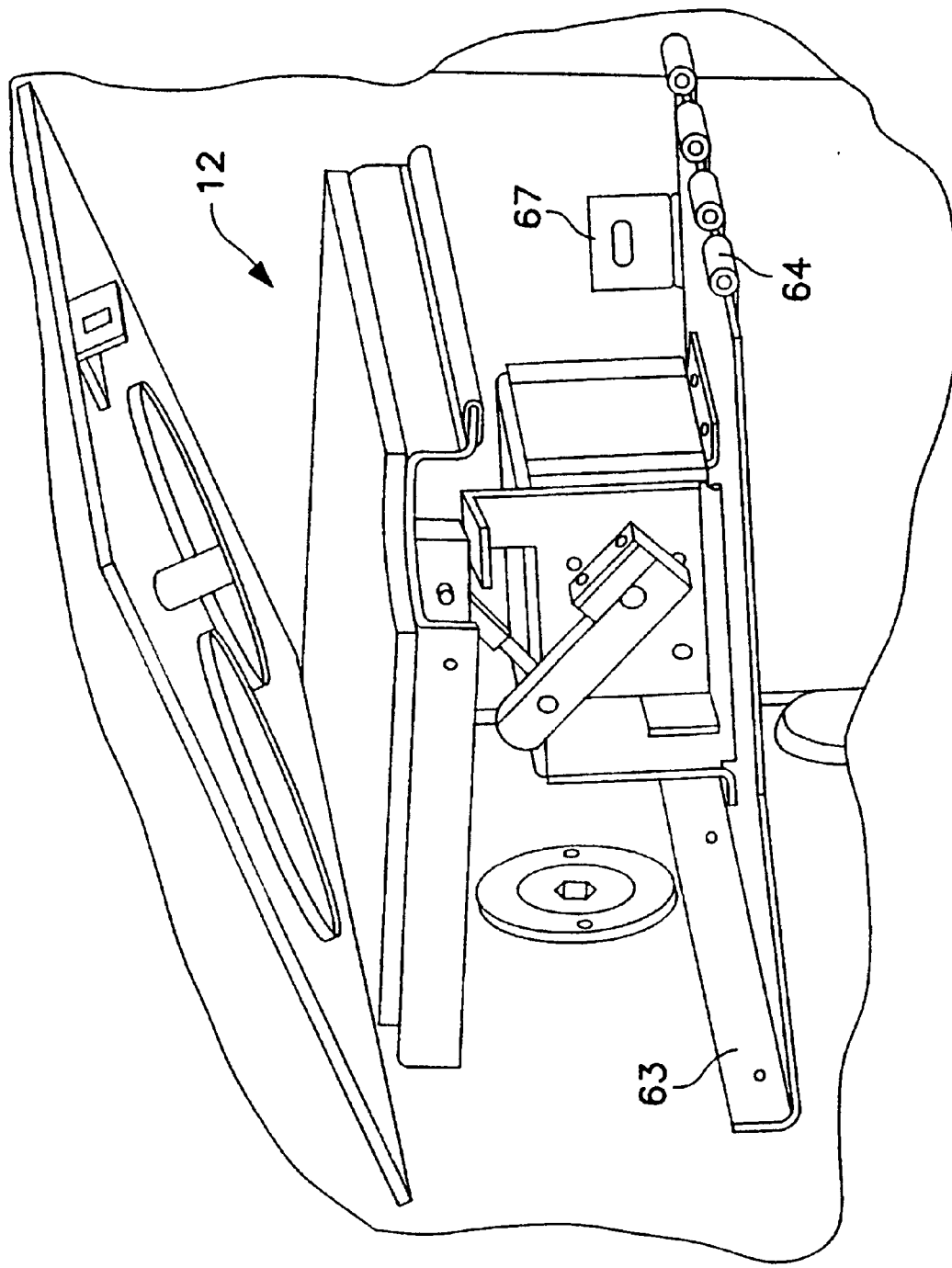
FIG. 7 is an isometric view of the fresh air exchange system of FIG. 6 with the door in the open position.
Figure 8:
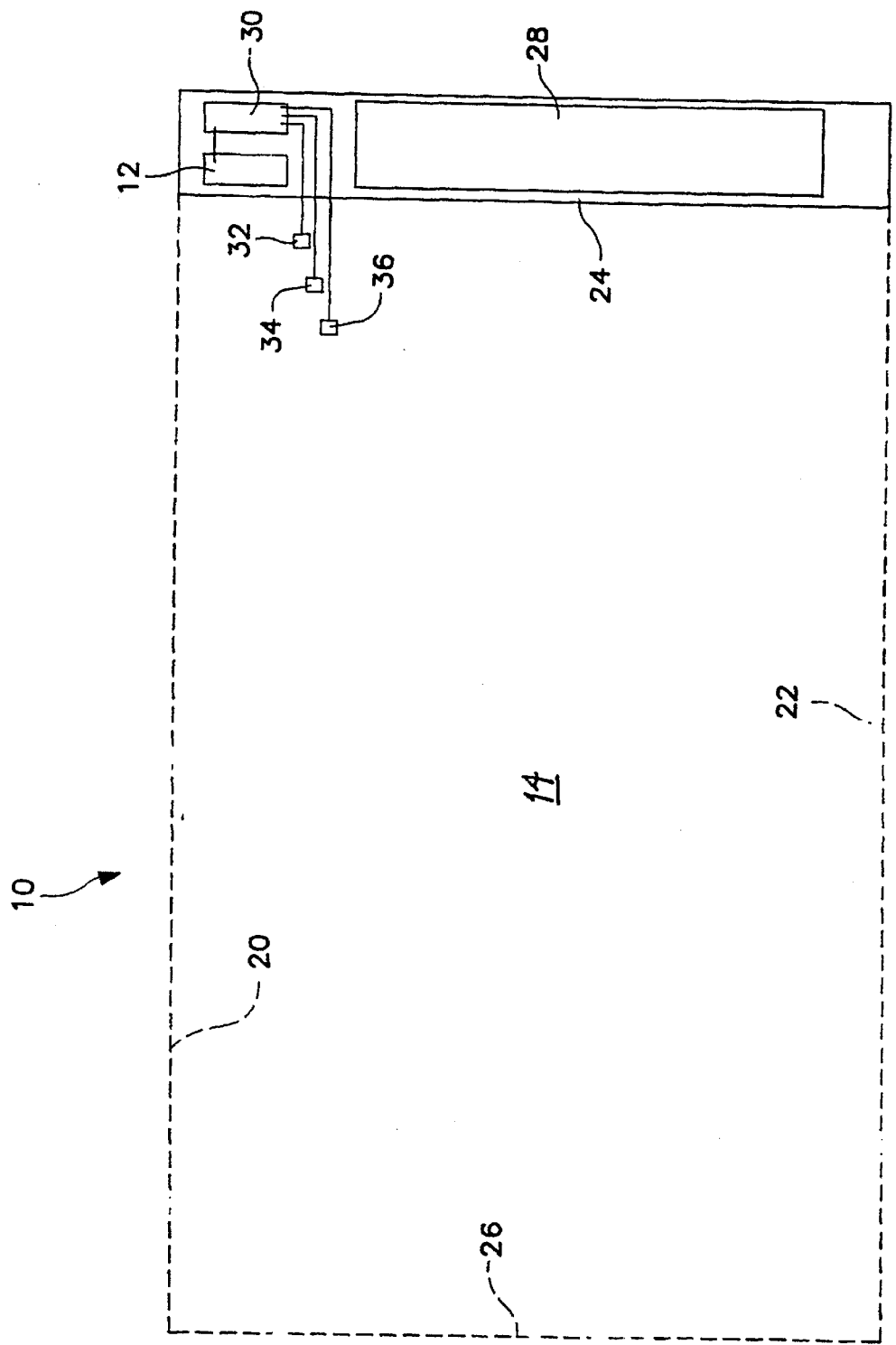
FIG. 8 is a schematic representation of the container, container temperature control system and fresh air exchange system.

Now turning to the drawing Figures, FIGS. 1–4 and 8 illustrate the container 10 that includes the fresh air exchange system of the present invention 12; and FIGS. 5–7 specifically illustrate the operation of the system 12.

Figure 1:
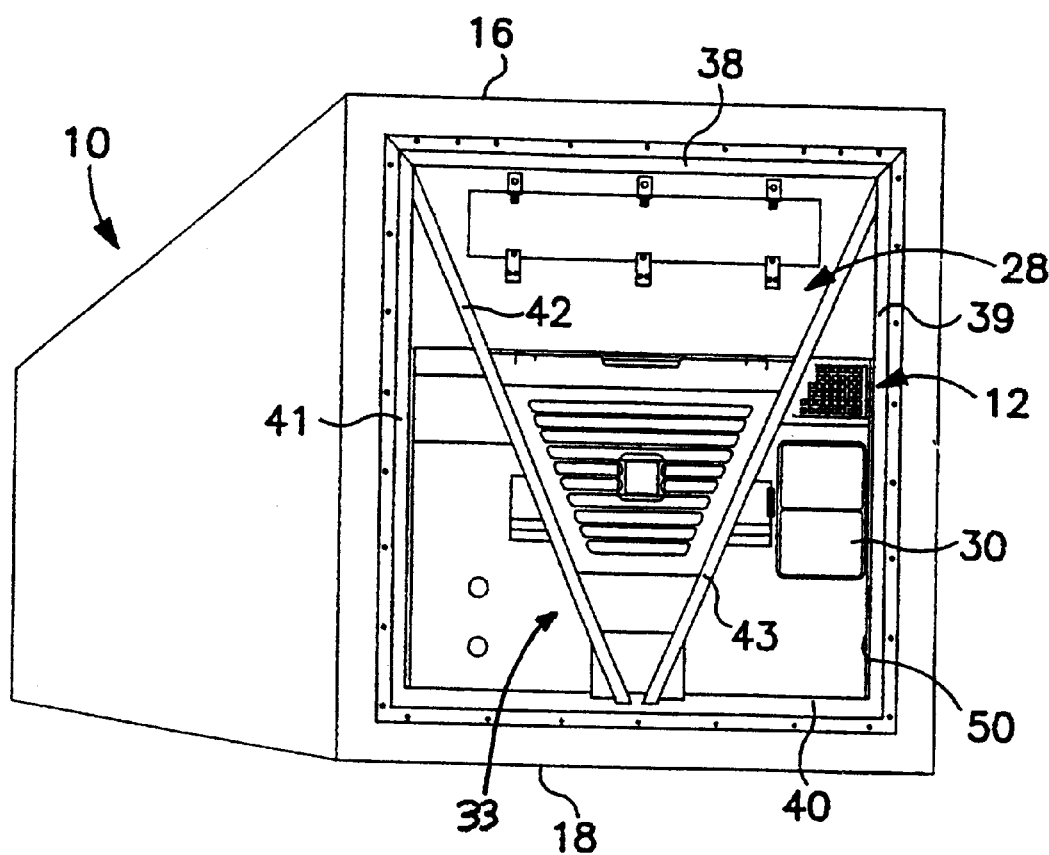
FIG. 1 is a perspective view of a container that includes a front panel comprised of a temperature control system that includes the automatic fresh air exchange system of the present invention.
Figure 2:
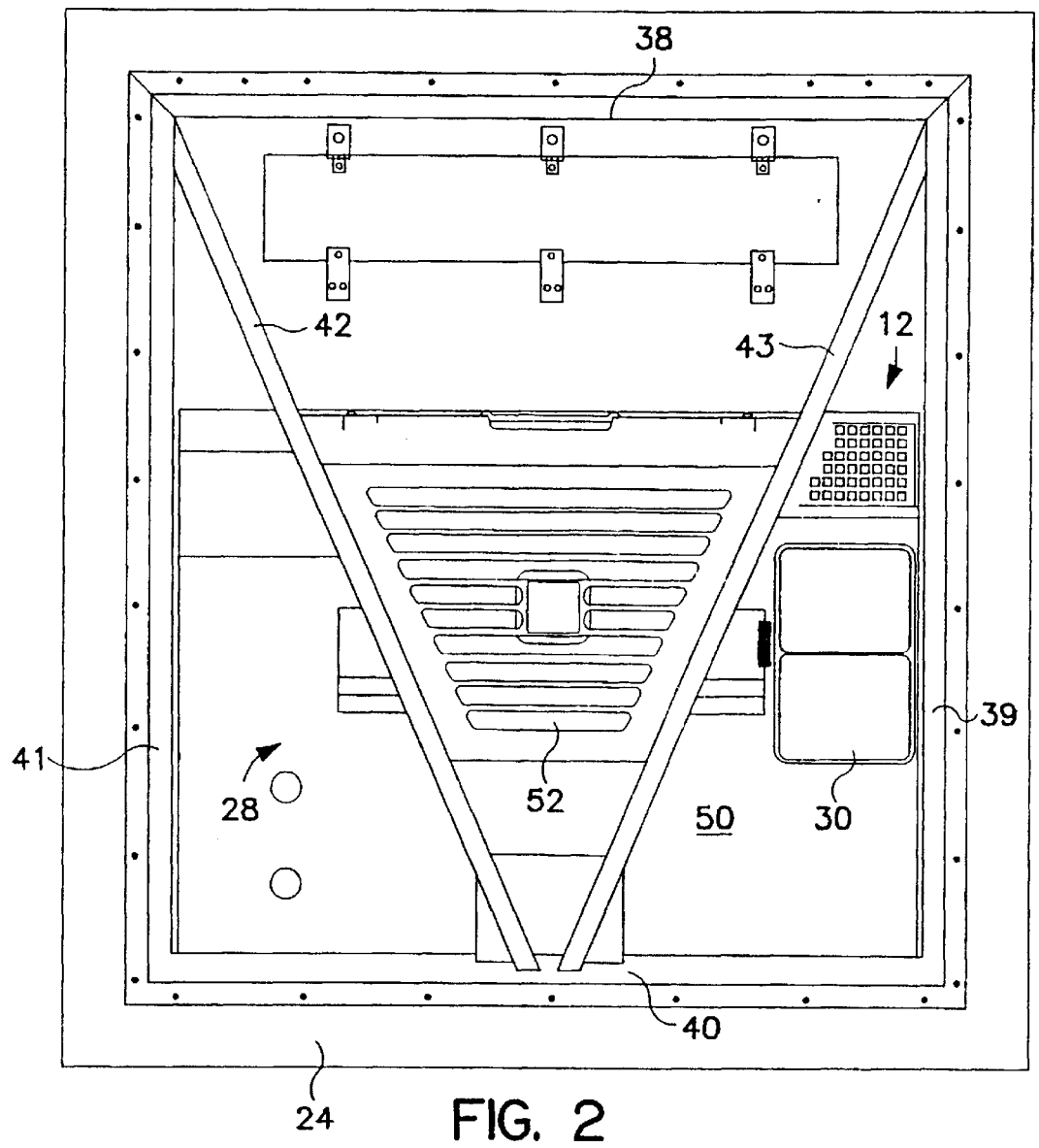
FIG. 2 is a front plan view of the container temperature control system which substantially comprises the front panel of the container of FIG. 1.

The container includes a conditioned space 14 that is defined by top panel 16, bottom panel 18, longitudinal side panels 20 and 22, and lateral side panels 24 and 26 that join the other top, bottom and longitudinal panels. The front lateral panel 24 is comprised of a temperature control system 28, as shown in FIGS. 1 and 2. With the exception of automatic fresh air exchange unit 12, the temperature control system 28 is of conventional, design well known to one skilled in the relevant art, and as a result, further detailed description of the system 28 is not required.

Operation of the temperature control system including fresh air exchange system 12 is controlled by microprocessor based controller 30. The controller is in signal receiving relation with conventional oxygen, carbon dioxide and load temperature sensors 32, 34, and 36 respectively that are located at the required sensing position in the conditioned space 14. The positioning of the sensors is shown generally in FIG. 8 however it should be understood that this is for illustrative purposes and the sensors 32, 34, and 36 may be located at any suitable location in the condition space 14. Temperature sensors 32 are located in the container controlled atmosphere chamber. The sensors 34 are spaced throughout the chamber to ensure an accurate chamber temperature is obtained. Sensors for sensing the relative percentage of carbon dioxide in the controlled atmosphere chamber are located at the front of the chamber and are preferably mounted on the inside of the front container wall illustrated in FIG. 1 and 2. The controller 30 is also connected to the fresh air exchange system in signal transmitting relation to system 12. The controller 30 controls the operation of the conventional components of system 28, and includes a conventional means for inputting set point values for operating parameters such as oxygen and carbon dioxide concentration levels, load temperature, and set point temperature, for example. The input means may be a tactile keypad.

Figure 3:
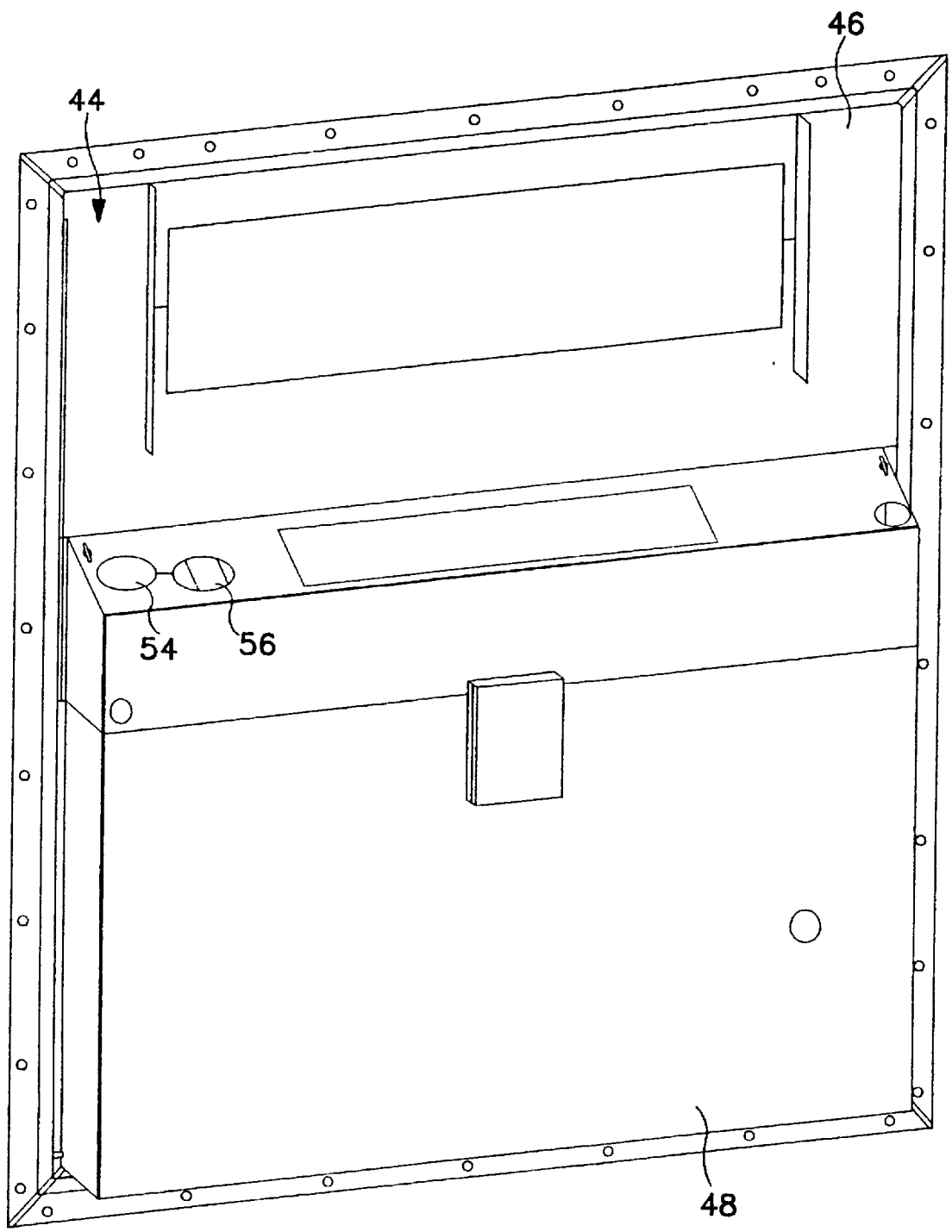
FIG. 3 is a rear isometric view of the temperature control system of FIG. 2.
Figure 4:
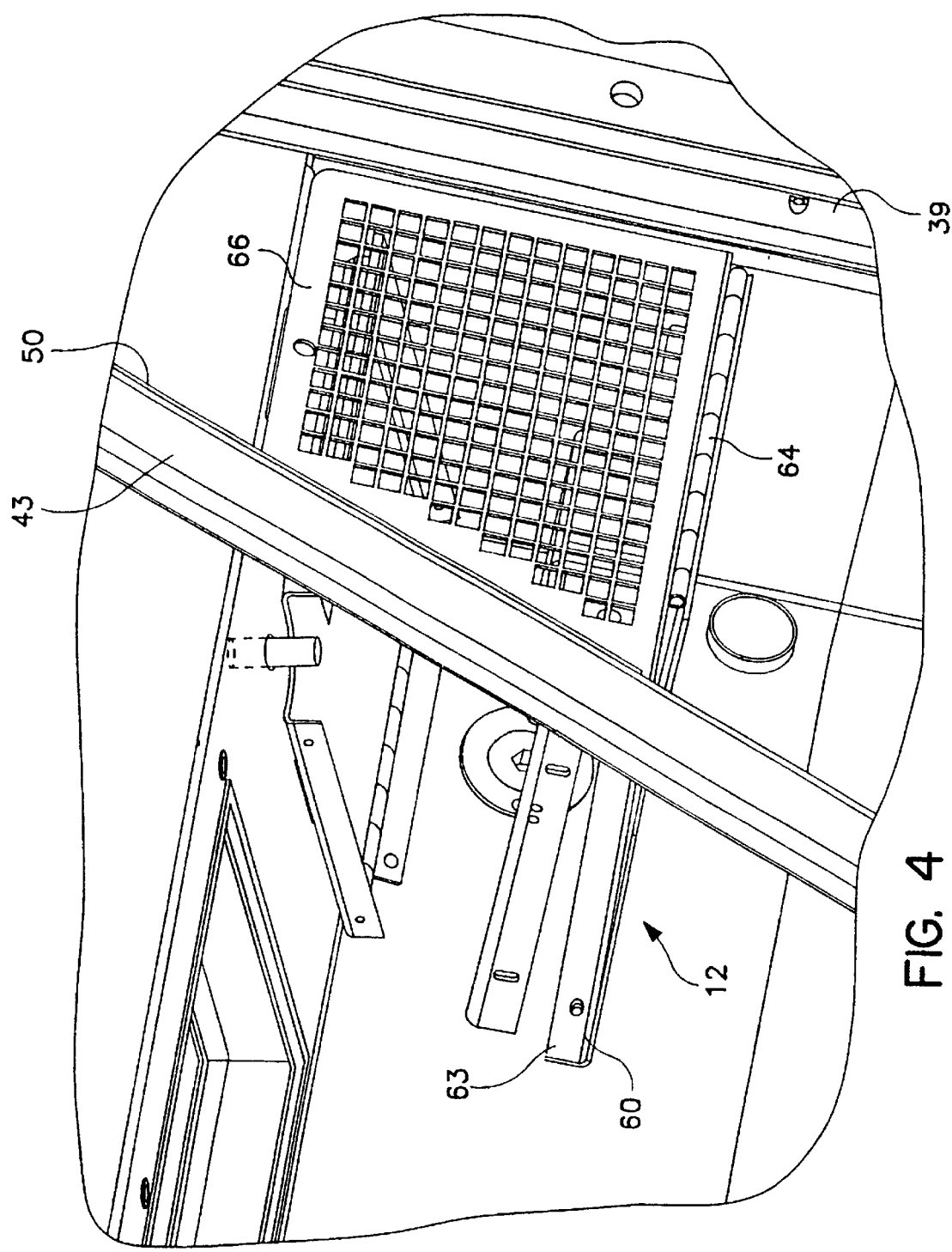
FIG. 4 is a partial view of the fresh air exchange system as mounted along the front of the container temperature control system.

The temperature control system 28 is supported by a frame 33 having a plurality of connected outer support members 38, 39, 40, and 41. The frame 33 includes a pair of inner support members 42 and 43 with one end connected to member 40 and an opposite end connected to respective members 41 and 39. As shown in FIG. 1, the inner support members converge to substantially from a V-shape. As illustrated in FIG. 3, system 28 is further supported by panel 44 having a substantially planar upper portion 46 and a rectangular lower portion 48. The lower portion 48 and members 39, 40, and 43 define an air exchange pocket 50 which is substantially triangle shaped.

A conventional fan 52 is located on the front panel and the fan provides the pressure differential that draws ambient fluid into the conditioned space 14 through intake opening 54 and displaces conditioned space air out the exhaust opening 56. The fan speed is controlled by controller unit 30.

The fresh air exchange system 12 of the present invention will now be described. Turning now to FIGS. 5, 6, and 7, system 12 is located in chamber 50 and includes a rigid tray 60 that is conventionialy and removably connected to lower portion 48 of wall 44 by upwardly turned flanges 61 and 63. The tray 60 is oriented substantially horizontally and supports repositioning motor 62.

Hinge 64 is provided along a tray free outer edge and a filter door 66 is adapted to be hingeably connected to tray hinge 64. As shown in FIG. 5 the door 66 includes a plurality of spaced apart rectangular apertures which permit ambient air to pass through the door 66 and prevent debris from being drawn into the conditioned space through openings 54 and 56. The door 66 may be locked by a conventional locking device that is passed through opening 70.

The repositioning motor 62 is preferably a twelve volt DC motor of conventional design. The repositioning motor 62 is in signal receiving relation with the system microprocessor 30. Door limit member 72 is provided on one side of the motor housing and limits the maximum amount that the door 74 can be moved when opened.

The door 74 is hingeably connected to portion 48 by conventional hinge 76, and in this way is moveable between closed and open positions as shown in FIGS. 6 and 7 respectively.

The door 74 is connected to motor 62 by links 78 and 80. One end of the first link 78 is rotatably connected to the motor 62 by a pin connection. The opposite end of the first link 78 is rotatably connected to the first end of the second link 80. The second end of the second link 80 is connected to a bracket 82 that is welded or otherwise conventionally attached to the underside of the door 74. In this way, movement of the pin moves the links 78 and 80 and thereby causes the door 74 to be repositioned toward or away from openings 54 and 56.

When it ii determined that the door 74 needs to be repositioned, the microprocessor 30 sends a signal to the motor 62, energizing the motor 62. The signal contains data that indicates the direction the motor 62 is to turn. The motor 62 turns in the required direction and moves the link 78. The movement of the link 78 in turn moves the link 80 and thereby moves the door 74. The motor 62 is energized until the door 74 is relocated at the desired position to obtain the requisite air exchange.

During,operation of the container unit, the microprocessor 30 obtains readings of temperature and carbon dioxide levels from the sensors 36, 34 and compares the values to desired set point values or ranges for these operating parameters. If one or both of these parameters is outside the desired set point value or range, the microprocessor 30 determines the direction and amount the door 74 must be repositioned to obtain the desired value or values for the operating parameters. Once the direction and distance have been determined, the microprocessor 30 sends the signal to the motor 62 actuating the motor 62 and repositioning the door 74.

Turning to FIGS. 9–12 that represent the controller logic, the operation of system 12 will be described in greater detail.

Microprocessor Controls the Fresh Air Exchange Rate

The fresh air exchange rate is programmed through the refrigerated container's microprocessor 30 in either cubic feet per minute, percent fresh air exchange door open, or cubic meters per hour. Once the exchange rate is set, the microprocessor 30 positions the fresh air exchange door 74 at the location required to provide the desired air exchange rate.

Fresh Air Exchange Based on Load Temperature

Figure 9:
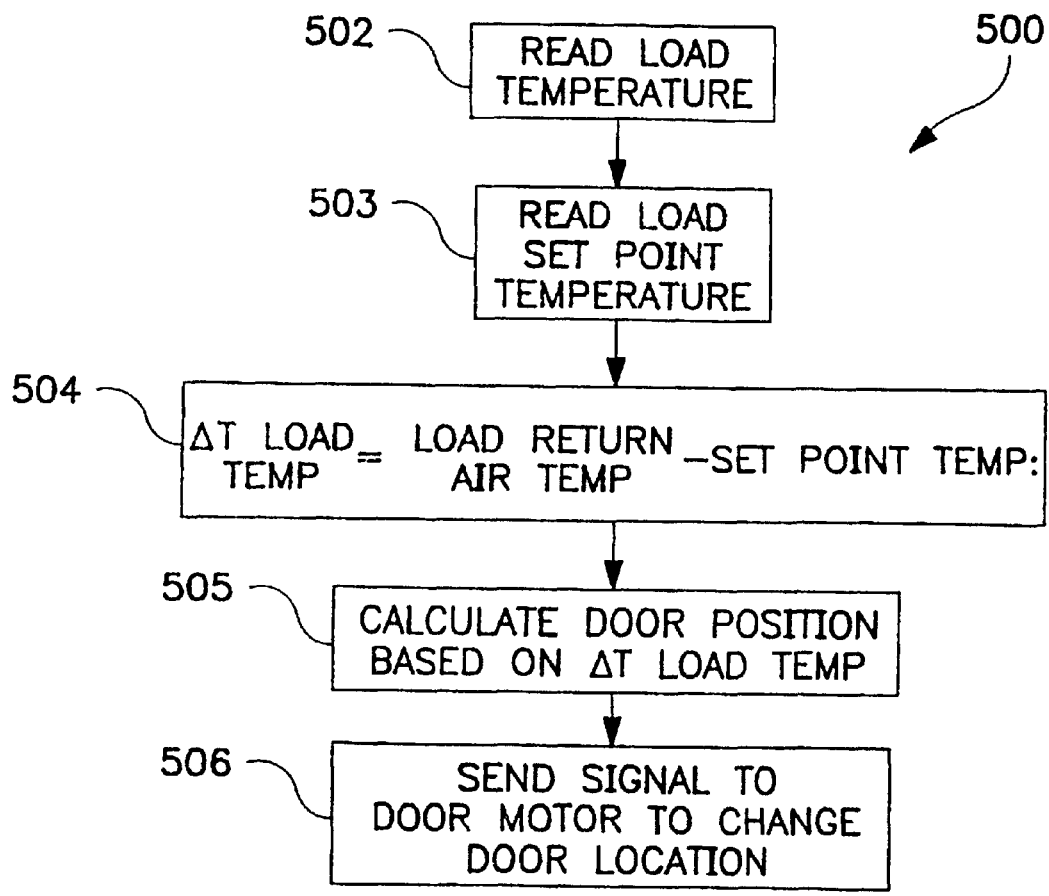
FIG. 9 is a flow chart representation of the portion of the fresh air exchange control logic that positions the door based on load temperature.

The fresh air exchange rate may be adjusted based on the load temperature. Turning now to FIG. 9, which generally represents the segment of controller logic where the fresh air exchange rate is adjusted based on load temperature. The logic is identified generally at 500.

In Step 502, the load temperature is obtained by sensor 36 and after reading the load set point temperature in Step 503, the load temperature is compared with the load set point temperature in Step 504.

In Step 505 if the load temperature is not equal to the set point temperature for the load, a new door position is calculated using the following equation:

$$\text{New Door Position} = (A1*e^{A2}) + (A3*\ln(A4)) + A5 + (A6*A7) + (A8*A9^2) + (A10*A11^3) + (A12*A13^4) \ldots$$

In the polynomial, the polynomial equation consists of various orders of the temperature differential computed in Step 505 with individual coefficients.

Once the new position is calculated, the microprocessor 30 sends a signal corresponding to the new position to the motor 62 to change the door 74 position the distance required to located the door 74 in the position which produces the desired fresh air exchange. See Step 506.

Programmable Delayed Opening of Fresh Air Exchange Door

From time to time, the cargo loaded in container 10 may have a temperature that is at or above the predetermined desired load set point temperature. In such situations, the field heat may be more rapidly removed from the load by keeping the fresh air exchange door 74 closed for a period of time and then automatically opening the door 74 when the closed door time limit has expired. At the expiration of the closed door time limit, the load temperature will be reduced to the load set point.

The closed door time limit is the operator determined period of time required to reduce the temperature of the load. In the present invention, the operator may manually enter a closed door time limit value in the microprocessor 30. The closed door time limit may be set in one hour increments for up to a total of seventy-two hours. Conversely, the operator can accept a default value of zero hours if no value is entered.

Figure 10:
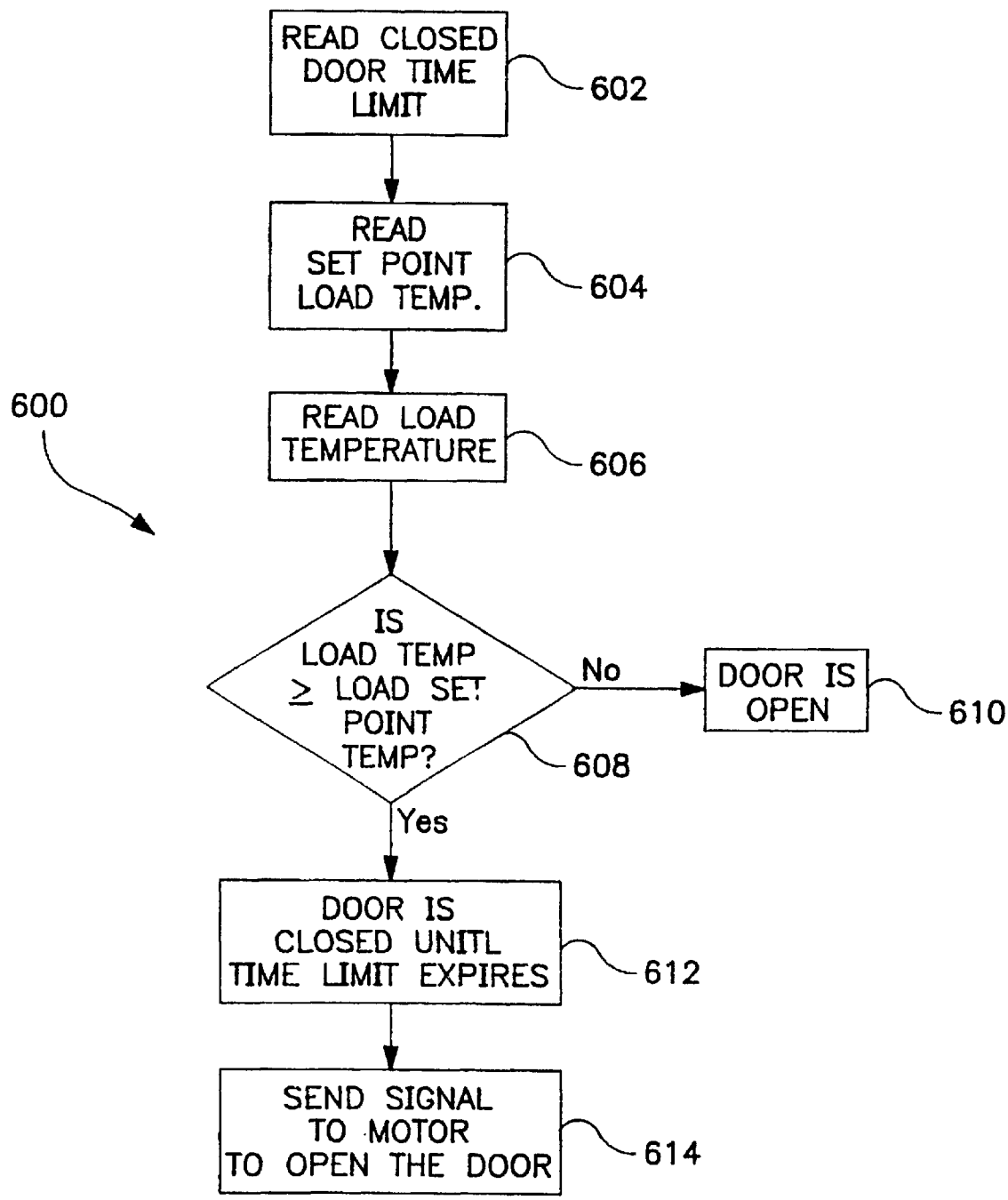
FIG. 10 is a flow chart representation of the portion of the fresh air exchange control logic that keeps the fresh air exchange door closed for a period of time during pull down.

Turning now to FIG. 10 which is a flow chart representation of Routine 600 for delayed opening of fresh air exchange door 74. The logic of routine 600 represents a portion of the logic routine executed by microprocessor controller 30. In Step 602 the processor reads the closed door time limit which may be either the value inputted by the operator or the system default value. In Steps 604 and 606 the system obtains the load set point temperature and actual load temperature respectively.

In Step 608 the processor determines if the load temperature is greater than or equal to the set point temperature for the load. If the load temperature is greater than or equal to the set point temperature, the fresh air exchange door 74 is kept closed until the closed door time limit expires in timer. See Step 612.

After the time limit expires, in Step 614 a signal is sent from the microprocessor 30 to the motor 62 to energize the motor 62 and open fresh air exchange door 74 the required amount.

This feature helps ensure that the container's interior temperature is brought down to the desired set point temperature before initiating fresh air exchange.

Because the door 74 can be programmed to remain closed for up to seventy-two hours, temperature pull down to the desired set point can be reached in half the time it would otherwise require with the door 74 open. As a result of the invention, container operators are no longer required to manually open fresh air exchange door 74 when they believe the load temperature is at the set point.

Frozen Lockout

When the load set point is programmed for frozen cargo, the microprocessor 30 automatically locks out the fresh air exchange by keeping the fresh air exchange door 66 closed during shipment. For the present invention frozen cargo is defined as a load with a temperature of five or more degrees below freezing temperature (e.g. 32° F. or 0° C.). If the load is frozen, it is not respirating and therefore there is not a need to provide fresh air to the load thereby permitting the door 74 to be closed.

Low Ambient Temperature Frozen Load Protection

Occasionally, the ambient temperature will fall well below the set point temperature for the load. On these occasions when the ambient temperature is far below the set point temperature the fresh air exchange door 74 may be closed to protect cargo from freezing since freezing can destroy the cargo.

If a high volume of very cold fresh air exchange causes the load temperature to drop below the set point, then the fresh air exchange door 74 must be incrementally closed to reduce the quantity of cold air delivered to the cargo.

The microprocessor 30 compares the load temperature to the load set point temperature, and if after the comparison the sensed load temperature value is deemed to be below the load set point temperature and the system is producing as much heat as it can, the microprocessor 30 sends a signal to the motor 62 which actuates the motor 62 and thereby incrementally closes the fresh air exchange door 74.

When the fresh air exchange door 74 is closed, the container becomes a closed system and the air in the container is recirculated through the container conditioned space 14 around the load.

The door 74 remains closed until the ambient temperature warms to a temperature that is not far below the set point temperature. At that point, the microprocessor 30 sends a signal to the motor 62 which causes the motor 62 to open the fresh air exchange door 74 the distance necessary to obtain the desired fresh air exchange rate.

Oxygen, Carbon Dioxide Monitoring and Control

The fresh air exchange system 12 can also be programmed based on the desired minimum oxygen and maximum carbon dioxide concentration levels. Sensors 32, 34 are used to measure the levels of the two gases. When the levels go out of a prescribed range, the microprocessor 30 will automatically adjust the fresh air exchange rate to keep the oxygen and carbon dioxide properly balanced for the container cargo.

Depending on the cargo, the container may include an oxygen sensor 32 only, a carbon dioxide sensor 34 only, carbon dioxide and oxygen sensors 32, 34 in combination, and in some instances the container may not include either $O_2$ or $CO_2$ sensors 32, 34. Whether or not to include carbon dioxide and oxygen sensors 32, 34 is dependent on the load to be transported in the container.

Figure 11:
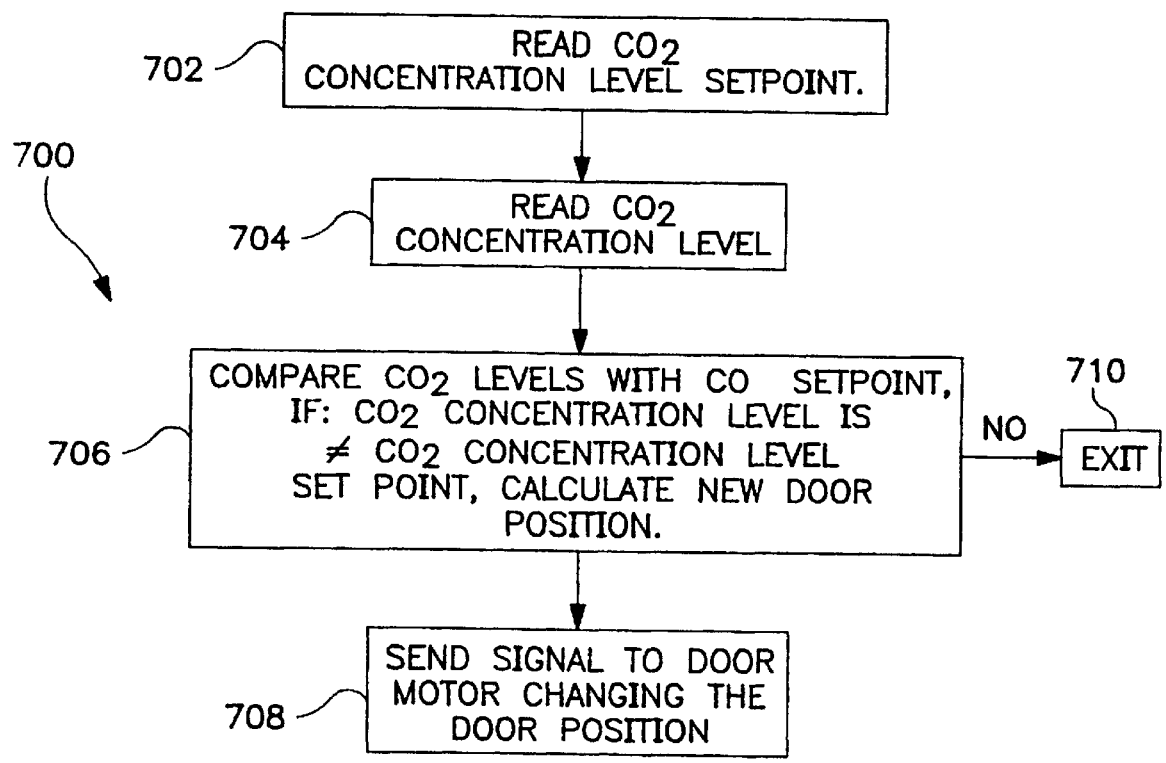
FIG. 11 is a flow chart representation of the portion of the fresh air exchange control logic that positions the door based on $CO_2$ concentration in the conditioned space air.
Figure 12:
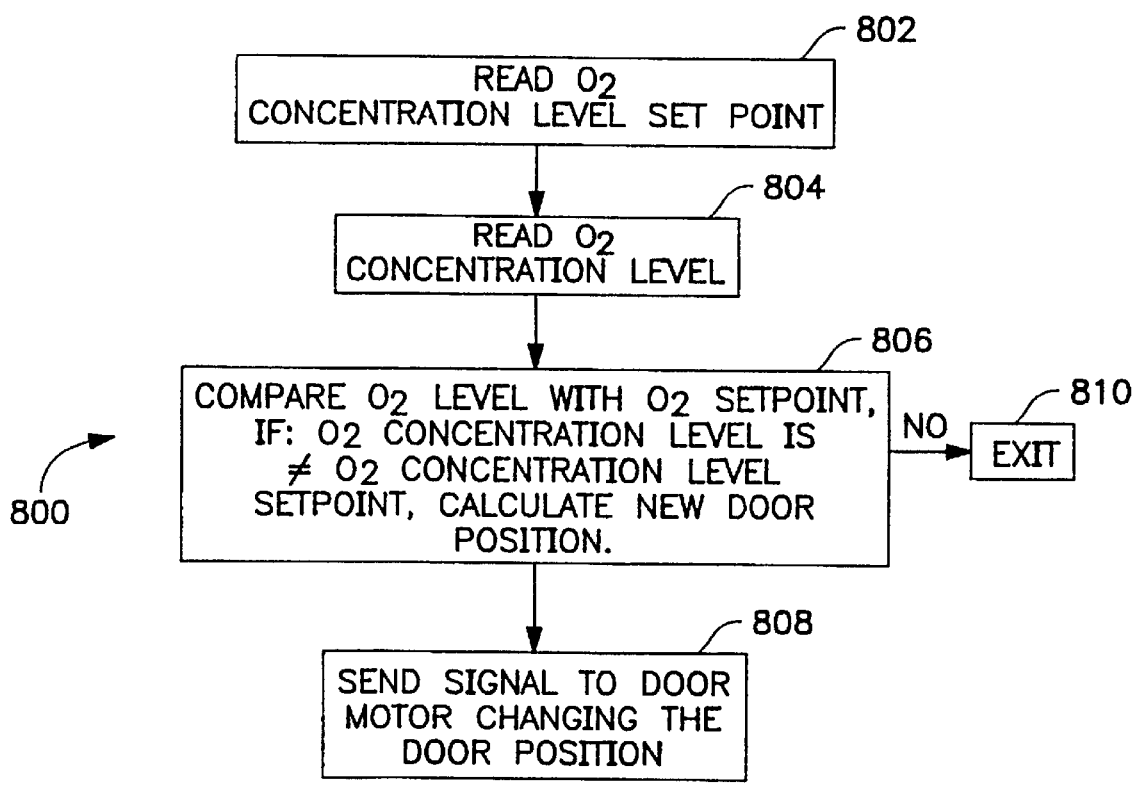
FIG. 12 is a flow chart representation of the portion of the fresh air exchange control logic that positions the door based on $O_2$ concentration in the conditioned space air.

The control algorithm for container 10 includes logic generally represented in FIGS. 11 and 12. FIG. 11 represents the logic for carbon dioxide concentration monitoring and FIG. 12 represents the logic for monitoring the levels of Oxygen concentration. The logic of FIGS. 11 and 12 is the same so the logic for sensing carbon dioxide and oxygen concentration levels will be described together. The operator enters a desired concentration value as a percentage of air for carbon dioxide and also for oxygen. The concentration level may be set at a value between zero and twenty-one percent. The set point carbon dioxide and oxygen concentration levels for the cargo are set at the input keypad of the microprocessor 30. The set point values are read in Steps 702 and 802.

If the concentration levels are not inputted they may be calculated based on load set point temperature using the following polynomial equation in the general form:

$$\text{Concentration Level} = (A1*e^{A2}) + (A3*\ln(A4)) + A5 + (A6*A7) + (A8*A9^2) + (A10*A11^3) + (A12*A13^4) \ldots$$

The polynomial algorithm is a conversion from temperature set point to concentration level where the concentration level equals various orders of the temperature set point with individual coefficients. The calculated concentration level for the gases is then saved in processor memory.

During operation of the container the carbon dioxide and oxygen sensors read the actual concentration levels in the container. See Steps 704 and 804.

In Steps 706 and 806 the sensed concentration levels are compared to the set point concentration levels. If the concentration levels are not equal to the set point concentration levels the microprocessor 30 calculates a new door position required to obtain the required concentration levels. If the actual concentration levels are equal or at least within an acceptable tolerance value of the desired set point concentration level, the routine is exited in Steps 710 and 810.

If a new door position is calculated by the microprocessor 30, in Steps 708 and 808 a signal is sent to the motor 62 changing the door position.

Record Fresh Air Exchange Data

User selected exchange rates, the load set point temperature, closed door time delay intervals, $O_2$ and $CO_2$ levels, and any changes made to these settings are automatically stored in microprocessor memory where it can be retrieved for analysis along with pertinent temperature and unit operation data.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described our invention what we claim is:

1. A container for transporting a load in conditioned space air, the container comprising:
    a plurality of container walls defining a closed conditioned space, an ambient air intake opening and a conditioned space air exhaust opening provided on one of the plurality of container walls;
    a temperature control system for controlling the temperature of the conditioned space air; and
    an ambient air exchange system including:
        a tray fixedly coupled to and extending outwardly from an other of the plurality of container walls;
        a controller;
        a door pivotably coupled to the other of the plurality of container walls and moveable between a first position, in which the door substantially covers at least one of the ambient air intake opening and the conditioned space air exhaust opening, and a second position, in which the door is spaced apart from the at least one of the ambient air intake opening and the conditioned space air exhaust opening;
        a motor coupled to the tray and in signal transmitting relation with the controller;

a first link having a first end and a second end, the first end being pivotably coupled to the motor; and a second link having a third end and a fourth end, the third end being pivotably coupled to the second end of the first link, the fourth end being pivotably coupled to the door, the motor, the first link, and the second link being operable to move the door between the first position and the second position.

2. The container as claimed in claim 1 wherein the container includes at least one sensor for measuring the value of container operating parameters, the at least one sensor being in signal transmitting relation with the controller.

3. The container as claimed in claim 2 wherein the at least one sensor is comprised of an oxygen sensor for sensing the percentage of the conditioned space air that is comprised of oxygen.

4. The container as claimed in claim 2 wherein the at least one sensor is comprised of a carbon dioxide sensor for sensing the percentage of the conditioned space air that is comprised of carbon dioxide.

5. The container as claimed in claim 1 wherein the ambient air exchange system and temperature control system are supported by a frame, the ambient air exchange system and the frame substantially comprising a container wall.

6. The container as claimed in claim 5 wherein the frame is comprised of a plurality of connected outer members and a pair of inner members that are connected to at least two of the plurality of connected outer members so that in combination the pair of inner frame members form a V-shape.

7. The container as claimed in claim 1 wherein the ambient air exchange system includes a second door pivotably coupled to the tray, the second door including a plurality of spaced apart rectangular apertures.

8. The container as claimed in claim 1, further comprising a door limit member positioned adjacent to the door, the door limit member being operable to prevent movement of the door beyond the second position.

9. A method of maintaining a predetermined oxygen level and a predetermined carbon dioxide level in a container with an air exchange system, the container having a plurality of container walls defining a conditioned space, an ambient air intake opening, and a conditioned space air exhaust opening, the ambient air intake opening and the conditioned space air exhaust opening communicating between atmosphere and the conditioned space, the ambient air exchange system including a temperature control system for controlling the temperature of the conditioned space, a controller, a motor, an oxygen sensor positioned in the conditioned space and in communication with the controller, a carbon dioxide sensor positioned in the conditioned space and in communication with the controller, a first temperature sensor positioned outside the conditioned space and in communication with the controller, a second temperature sensor in thermal communication with the conditioned space and in communication with the controller, and a door pivotably coupled to at least one of the plurality of container walls and moveable between a first position, in which the door substantially covers at least one of the ambient air intake opening and the conditioned space air exhaust opening, and a second position, in which the first door is spaced apart from the at least one of the ambient air intake opening and the conditioned space air exhaust opening, the method comprising:

sensing an oxygen level in the conditioned space with the oxygen sensor;

comparing the oxygen level and the predetermined oxygen level;

moving the door between the first position and the second position and exchanging conditioned space air and atmosphere air if the oxygen level is below the predetermined oxygen level;

sensing a carbon dioxide level in the conditioned space with the carbon dioxide sensor;

comparing the carbon dioxide level and the predetermined carbon dioxide level;

moving the door between the first position and the second position and exchanging conditioned space air and atmosphere air if the carbon dioxide level is above the predetermined carbon dioxide level;

sensing the conditioned space temperature with the second temperature sensor; and preventing movement of the door from the first position toward the second position until the conditioned space temperature is less than or equal to the set point temperature.

10. The method as claimed in claim 9 wherein the oxygen sensor is operable to determine the percentage of oxygen in conditioned space air and the carbon dioxide sensor is operable to determine the percentage of carbon dioxide in conditioned space air.

11. The method as claimed in claim 9, wherein the conditioned space has a conditioned space temperature, and the method further comprises providing a conditioned space set point temperature, comparing the conditioned space temperature and the conditioned space set point temperature and moving the door toward the first position for a period of time required to bring the conditioned space temperature to the conditioned space set point temperature if the conditioned space temperature is above the conditioned space set point temperature.

12. The method as claimed in claim 11 wherein the time period is less than or equal to about seventy-two hours.

13. The method as claimed in claim 11 wherein the time period includes one or more one-hour segments.

14. The method as claimed in claim 11 wherein the position of door is changed by energizing the motor, and the method further comprises sending a signal from the controller to the motor at the expiration of the time period.

15. The method as claimed in claim 9, further comprising sensing ambient temperature, sensing conditioned space temperature, comparing the ambient temperature and the conditioned space set point temperature and if the ambient temperature is less than the conditioned space set point temperature, moving the door toward the first position.

16. The method as claimed in claim 15, further comprising maintaining the door in the second position if the ambient temperature is at least ten degrees less than the conditioned space set point temperature.

17. The method as claimed in claim 9, wherein the conditioned space has a conditioned space temperature, and the method further comprises providing a conditioned space set point temperature, comparing the conditioned space temperature and the conditioned space set point temperature, moving the door toward the first position if the conditioned space set point temperature is below freezing.

18. A method of maintaining a predetermined oxygen level and a predetermined carbon dioxide level in a container with an air exchange system, the container defining a conditioned space, an ambient air intake opening, and a conditioned space air exhaust opening, the ambient air intake opening and the conditioned space air exhaust opening communicating between atmosphere and the conditioned space, the ambient air exchange system including a temperature control system for controlling the temperature of the conditioned space, a first temperature sensor positioned outside the conditioned space, a controller, a second temperature sensor in thermal communication with the conditioned space, an oxygen sensor positioned in the conditioned space and in communication with the controller, a carbon dioxide sensor positioned in the conditioned space and in communication with the controller, and a door moveable between a first position, in which the door substantially covers at least one of the ambient air intake opening and the conditioned space exhaust opening, and a second position, in which the door is spaced apart from the at least one of the ambient air intake opening and the conditioned space exhaust opening, the method comprising:

providing a conditioned space set point temperature;

sensing atmosphere temperature with the temperature sensor;

sensing an actual oxygen level in the conditioned space with the oxygen sensor;

comparing the actual oxygen level and the predetermined oxygen level;

moving the door between the first position and the second position and exchanging conditioned space air and atmosphere air if the actual oxygen level is below the predetermined oxygen level;

sensing an actual carbon dioxide level in the conditioned space with the carbon dioxide sensor;

comparing the actual carbon dioxide level and the predetermined carbon dioxide level;

moving the door between the first position and the second position and exchanging conditioned space air and atmosphere air if the actual carbon dioxide level is above the predetermined carbon dioxide level;

sensing atmosphere temperature with the first temperature sensor;

sensing conditioned space temperature with the second temperature sensor; and delaying movement of the door between the first position and the second position for a period of time if the conditioned space set point temperature is above atmosphere temperature.

19. The method of claim 18, wherein the time period is user selectable.

20. The method of claim 18, wherein the ambient air exchange system includes a second temperature sensor in thermal communication with the conditioned space, and the method further comprises sensing the conditioned space temperature with the second temperature sensor and preventing movement of the door from the first position toward the second position until the conditioned space temperature is less than or equal to the set point temperature.

21. The method of claim 18, further comprising preventing movement of the door from the first position toward the second position if the set point temperature is below freezing.

22. A method of maintaining a predetermined oxygen level in a container with an air exchange system, the container having a plurality of container walls defining a conditioned space, an ambient air intake opening, and a conditioned space air exhaust opening, the ambient air intake opening and the conditioned space air exhaust opening communicating between atmosphere and the conditioned space, the ambient air exchange system including a temperature control system for controlling the temperature of the conditioned space, a controller, a motor, an oxygen sensor positioned in the conditioned space and in communication with the controller, a first temperature sensor positioned outside the conditioned space and in communication with the controller, a second temperature sensor in thermal communication with the conditioned space and in communication with the controller, and a door pivotably coupled to at least one of the plurality of container walls and moveable between a first position, in which the door substantially covers at least one of the ambient air intake opening and the conditioned space air exhaust opening, and a second position, in which the first door is spaced apart from the at least one of the ambient air intake opening and the conditioned space air exhaust opening, the method comprising:

providing a conditioned space set point temperature;

comparing the conditioned space set point temperature and the conditioned space temperature;

conditioning the conditioned space with the temperature control unit;

maintaining the door in the first position for a period of time required to bring the conditioned space temperature toward the conditioned space set point temperature;

sensing an oxygen level in the conditioned space with the oxygen sensor;

comparing the oxygen level and the predetermined oxygen level; and moving the door between the first position and the second position and exchanging conditioned space air and atmosphere air if the oxygen level is below the predetermined oxygen level.

* * * * *